United States Patent [19]
Hyatt, Jr. et al.

[11] Patent Number: 5,736,805
[45] Date of Patent: Apr. 7, 1998

[54] BRUSH RETAINING CLIP AND ELECTRICAL CONNECTION

[75] Inventors: Robert L. Hyatt, Jr., Stow; Robert A. Ciccarelli, Jr., Kent, both of Ohio

[73] Assignee: Ametek, Inc., Kent, Ohio

[21] Appl. No.: 602,311

[22] Filed: Feb. 16, 1996

[51] Int. Cl.⁶ .......................... H02K 13/00; H02K 15/00
[52] U.S. Cl. .................. 310/249; 310/71; 310/238; 310/239
[58] Field of Search ........................ 310/249, 248, 310/247, 245, 71, 238, 239

[56] References Cited

U.S. PATENT DOCUMENTS

| | | | |
|---|---|---|---|
| 4,250,613 | 2/1981 | Sauerwein et al. | 29/597 |
| 4,293,789 | 10/1981 | King | 310/239 |
| 4,828,221 | 5/1989 | Scobie et al. | 251/308 |
| 4,851,730 | 7/1989 | Fushiya et al. | 310/249 |
| 4,873,464 | 10/1989 | Wang | 310/249 |
| 5,105,896 | 5/1991 | Wong | 310/71 |
| 5,149,999 | 9/1992 | Abo et al. | 310/239 |
| 5,153,474 | 10/1992 | Wong et al. | 310/245 |
| 5,444,320 | 8/1995 | Clarke et al. | 310/239 |

*Primary Examiner*—Steven L. Stephan
*Assistant Examiner*—Tran N. Nguyen
*Attorney, Agent, or Firm*—Renner, Kenner, Greive, Bobak, Taylor & Weber

[57] ABSTRACT

A combined commutator brush retainer clip and electrical connector includes a main body portion and a terminal portion. The main body portion has a recessed portion with a plurality of dimples therein. A commutator brush is electrically connected to a brush holder sleeve, and the brush holder sleeve is, in turn, clampingly engaged to the commutator housing with the retainer. The brush holder sleeve is disposed within the recessed portion of the retaining clip and is frictionally engaged by the dimples. The terminal portion of the retainer engages a corresponding terminal member on the motor stator such that an electrical connection is established between said commutator brush and said stator by way of said retainer.

13 Claims, 3 Drawing Sheets

BRUSH RETAINING CLIP AND ELECTRICAL CONNECTION

TECHNICAL FIELD

The invention herein resides in the art of retainers for commutating brush assemblies and electrical connections for effecting a connection between the commutating brush and the stator. More particularly, the invention relates to the combination of a commutating brush retaining clip and electrical connection.

BACKGROUND ART

Heretofore, it has been known to use commutated motor assemblies for a wide variety of applications. Accordingly, a wide variety of means have been employed for maintaining commutating brushes in proper position relative to the commutator. For example, it has been known to use molded commutator housings having brush holders molded therein. It has also been known to use separate metal brush holders which are insulated from the commutator housing by integrated plastic holders. Similarly, separate plastic brush holders are often used and are typically secured to the commutator housing by way of a retaining clip.

Electrical contact between the commutating brush and the stator has been effected by way of a lead wire which is generally affixed to the brush member and also to the stator. Alternatively, it has been known to establish a connection between the brush and the brush holder and then, in turn, between the brush holder and the stator.

Such previously known methods for maintaining commutating brushes and for establishing the requisite electrical connection therewith, have resulted in greater manufacturing expenses due to the numerous required parts and the resulting added labor due to material handling and ergonomic problems.

Thus it is most desirable to obtain a device for both retaining a commutator brush assembly and making the requisite electrical connection without the disadvantages of previously known devices.

DISCLOSURE OF INVENTION

In light of the foregoing, it is an aspect of the invention to provide a brush retaining device for commutating brush assemblies.

Another aspect of the invention is the provision of an electrical connection from a commutating brush member to the motor stator assembly.

Yet an additional aspect of the invention is the provision of a retaining device for a commutating brush assembly in combination with an electrical connection.

Still other aspects of the invention are the provision of a combined retainer for commutating brush assemblies and electrical connection which is less expensive to manufacture, requires less parts, and less material handling than previously known devices.

Yet another aspect of the invention is the provision of a combined retainer and electrical connection for commutating brush assemblies which is easy to implement with existing techniques and equipment.

The foregoing and other aspects of the invention which will become apparent as the detailed description proceeds are achieved by a combined commutator brush retaining clip and electrical connector for a commutated motor having a motor housing with a stator and a rotor disposed therein, the rotor having a commutator, the combined retaining clip and electrical connector comprising: a main body portion; a terminal portion extending from said main body portion; said main body portion having means for maintaining a brush and brush holder assembly to the housing and also in electrical contact with the commutator; and, said terminal portion having means for establishing an electrical connection between the brush and brush holder assembly and the stator.

Other aspects of the invention are attained by a combined commutator brush retainer and electrical connector assembly comprising: a commutator housing; a rotor disposed within said commutator housing, said rotor having a commutator thereon; a stator also disposed within said commutator housing; a commutator brush; a brush holder sleeve; and, clip means for retaining said commutator brush to said commutator housing and for establishing an electrical connection between said commutator brush and said stator.

Still other aspects of the invention are attained by an improved commutator brush retainer and electrical connector for a commutated motor assembly having a commutator housing, a stator portion disposed in the housing, a rotor portion disposed in the stator, a commutator on the rotor and a commutator brush, the improvement comprising: clip means for retaining the commutator brush to the commutator housing and for establishing electrical connection between the commutator brush and the stator.

BRIEF DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
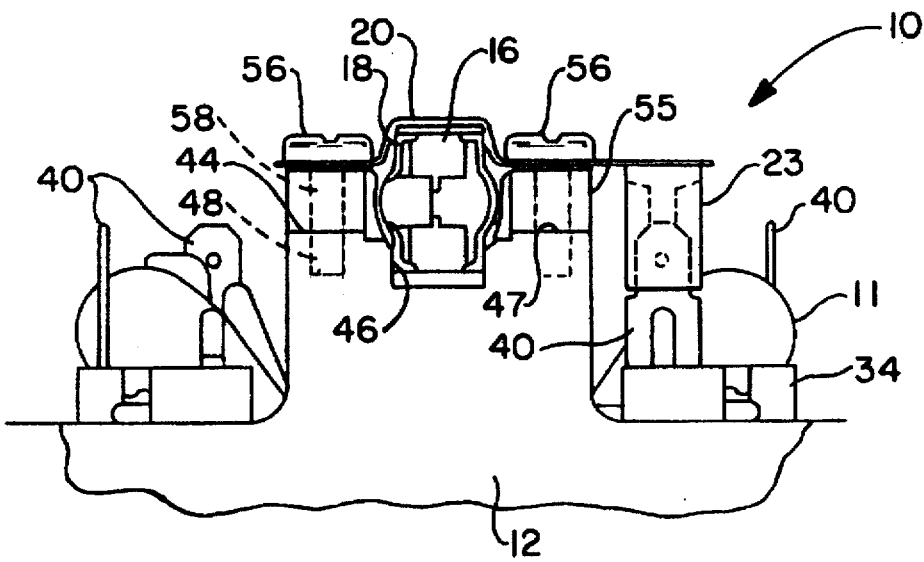
FIG. 1 is an elevational view of a commutator assembly according to the invention.
Figure 2:
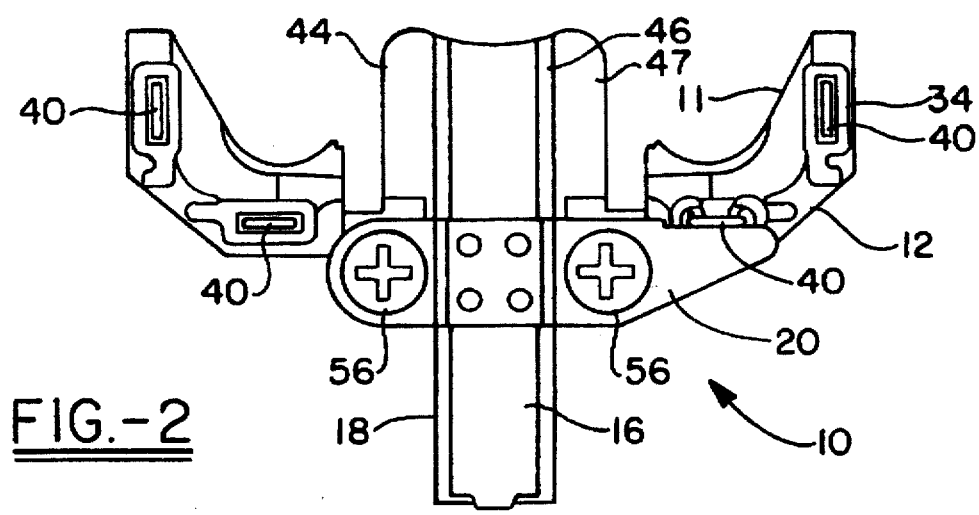
FIG. 2 is a top plan view of the commutator assembly of FIG. 1.

Referring now to the drawings, it can be seen that a commutator assembly according to the invention is designated generally by the numeral 10. While it will be appreciated that the concept of the invention is applicable to any commutated motor assembly, the description herein will be with respect to a commutator assembly of the nature shown. In such a device, a stator 11 is disposed within a commutator housing 12. A rotor assembly 14 having a commutator 15 integrated therewith, is disposed with the commutator housing 12 as shown. A pair of commutator brushes 16 are disposed within the commutator housing 12, such that they are in contact with the commutator 15. As can be seen the brushes 16 are maintained in the commutator housing 12 by way of brush sleeves 18 which are clampingly affixed to the housing by way of the novel retaining clip 20.

Figure 3:
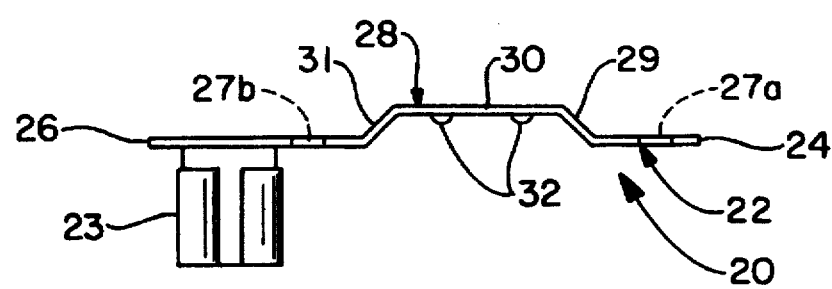
FIG. 3 is an elevational view of the combined retainer and connector according to the invention.
Figure 4:
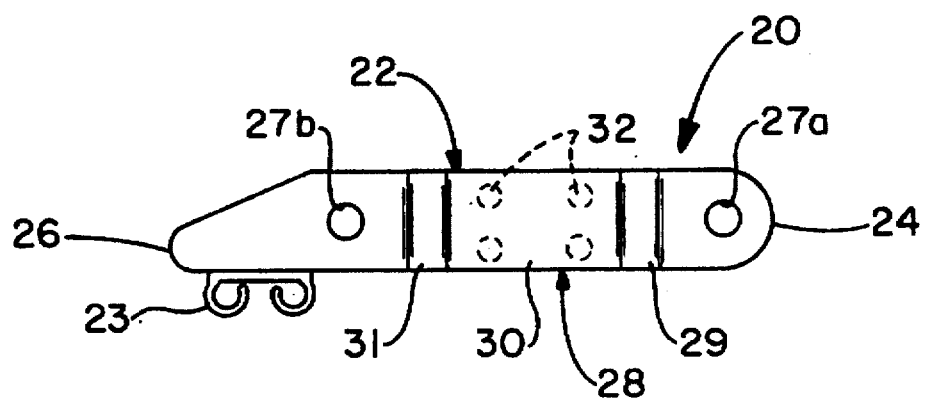
FIG. 4 is a top plan view of the retainer/connector of FIG. 3.

With reference now to FIGS. 3 and 4 it can be seen that the retaining clip 20 according to the concept of the invention is comprised of a thin metal strap member having a main body portion 22 disposed along a first plane and a terminal portion 23 disposed along a second plane, generally perpendicular to the first plane. The main body portion 22 of the retaining clip 20 is defined generally by first and second ends 24 and 26 respectively. Proximal to the first end 24 is a first fastener aperture 27a. Adjacent to the first fastener aperture 27a the main body portion 22 of the retaining clip 20 is bent to form a stepped portion 28. The stepped portion 28 includes a first wall 29 which is formed where the body portion 22 is bent upwardly from the area proximal to the aperture 27a. A second wall 30 is disposed generally orthogonally to the first wall 29 and is thus disposed parallel to the main body 22. Similarly, a third wall 31 is disposed orthogonal to the second wall 30 and connects the remainder of the main body portion 22 as shown. A second fastener aperture 27b is located in the main body portion 22 proximal to the third wall 31 of the stepped portion. For reasons which will become apparent as the description continues the second wall 30 of the stepped portion 28 includes a plurality of depressions or dimples 32 therein.

Proximal to the second end 26 of the retaining clip 20 is the terminal portion 23 of the clip 20. As shown, the terminal portion 23 is bent perpendicularly downward relative to the main body portion 22 of the clip 20. The terminal portion 23 of the clip 20 is adapted to engage matingly a corresponding terminal on the stator board 34. Accordingly, depending upon the type of connection desired the terminal portion 23 of the clip 20 may be formed into a terminal tab or a conventional crimped faston style connector having rolled edges so as to form an engagement slot therebetween.

The stator 11 of the assembly 10 is of a conventional design having a plurality of stacked lamination plates with a plurality of stator windings disposed therein. A plastic terminal board 39 may also be included having a plurality of terminal tabs 40 located therein for terminating the stator windings 38.

The stator assembly 11 is disposed within a commutator housing 12 having a traditional cup-shaped design. The cup portion 42 of the housing 12 includes a plurality of apertures 43 disposed around the periphery thereof. A pair of brush holder mounts 44 are similarly disposed in the cup portion 42 of the commutator housing 12. As shown, the brush holder mounts 44 are diametrically opposed from one another between apertures 43. Each brush holder mount 44 includes a brush holder groove 46 disposed within a mounting plane 47. The mounting plane 47 includes fastener apertures 48 located on either side of the brush holder groove 46 in a spaced relationship equal to the spacial distance between the fastener apertures 27 of the retaining clip 20. Similarly, it should be noted that the width of the brush holder groove 46 is approximately equal to the width of the stepped portion of the retaining clip 20.

The brushes 16 are mounted in brush sleeves 18 comprising a generally rectangular tube member having an open end 50 and a closed end 51. A conventional carbon brush 16 is disposed within the sleeve 18 such that the pigtail wire 52 is affixed to the closed end 51 of the sleeve 18 on the inside thereof. A coil spring 54 is interposed between the brush 16 and the closed end 51 of the sleeve 18 so as to bias the brush 16 toward the open end 50 of the sleeve 18. Accordingly, electrical contact is established between the brush 16 and the brush holder sleeve 18. The brush assembly is mounted in the commutator housing 12 such that the open end 50 of the brush sleeve 18 and thus, the carbon portion of the brush 16 projects into the cup portion 42 of the housing 12. This is accomplished by orienting the brush sleeve 18 in the brush holder groove 46 of the brush holder mounts 44.

With the brushes 16 and brush sleeves 18 residing in the brush holder grooves 46, the retaining clip 20 is placed in a saddle configuration across the brush holder sleeve 18 such that the brush holder sleeve 18 is disposed within the stepped portion 28 of the clip 20. A pair of cylindrical spacers 55 are interposed between the clip 20 and the mounting plane 47 of the brush holder mount 44. Appropriate fasteners such as screws 56 are then placed in the fastener apertures 27 of the clip 20 through a central bore 58 of the spacer 55 so as to threadingly engage the fastener apertures 48 of the mounting plane 47. As should now be apparent, when the fasteners or screws 56 are sufficiently torqued against the spacers 55 the retaining clip 20 clampingly engages the brushes 16 and brush sleeves 18 against the brush holder mounts 44. It should further be apparent that the dimples 32 located in the stepped portion 28 of the retaining clip 20 serve to frictionally engage the brush holder sleeves 18 so as to prevent the brush assembly from being displaced relative to the stator 11.

Figure 6:
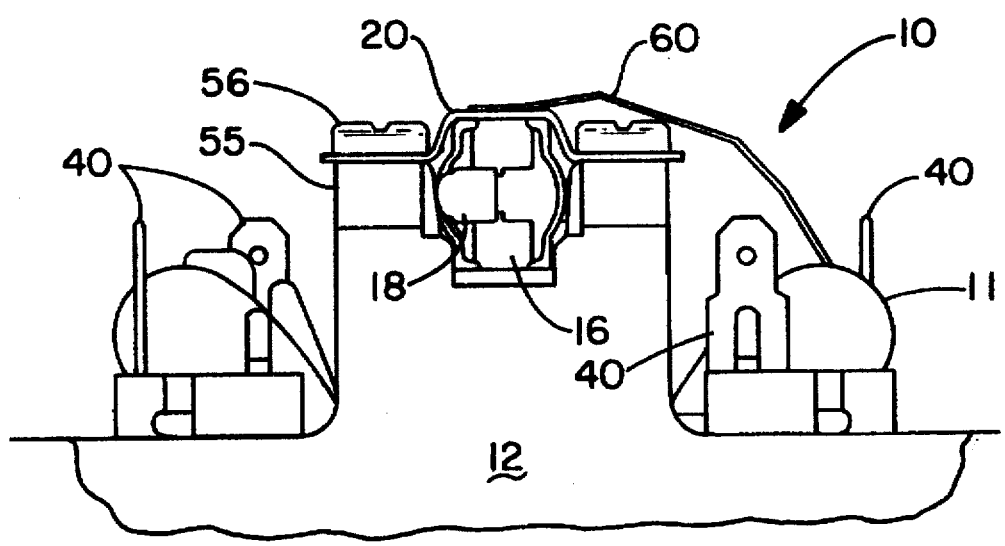
FIG. 6 is an elevational view of an alternative embodiment of the invention.
Figure 5:
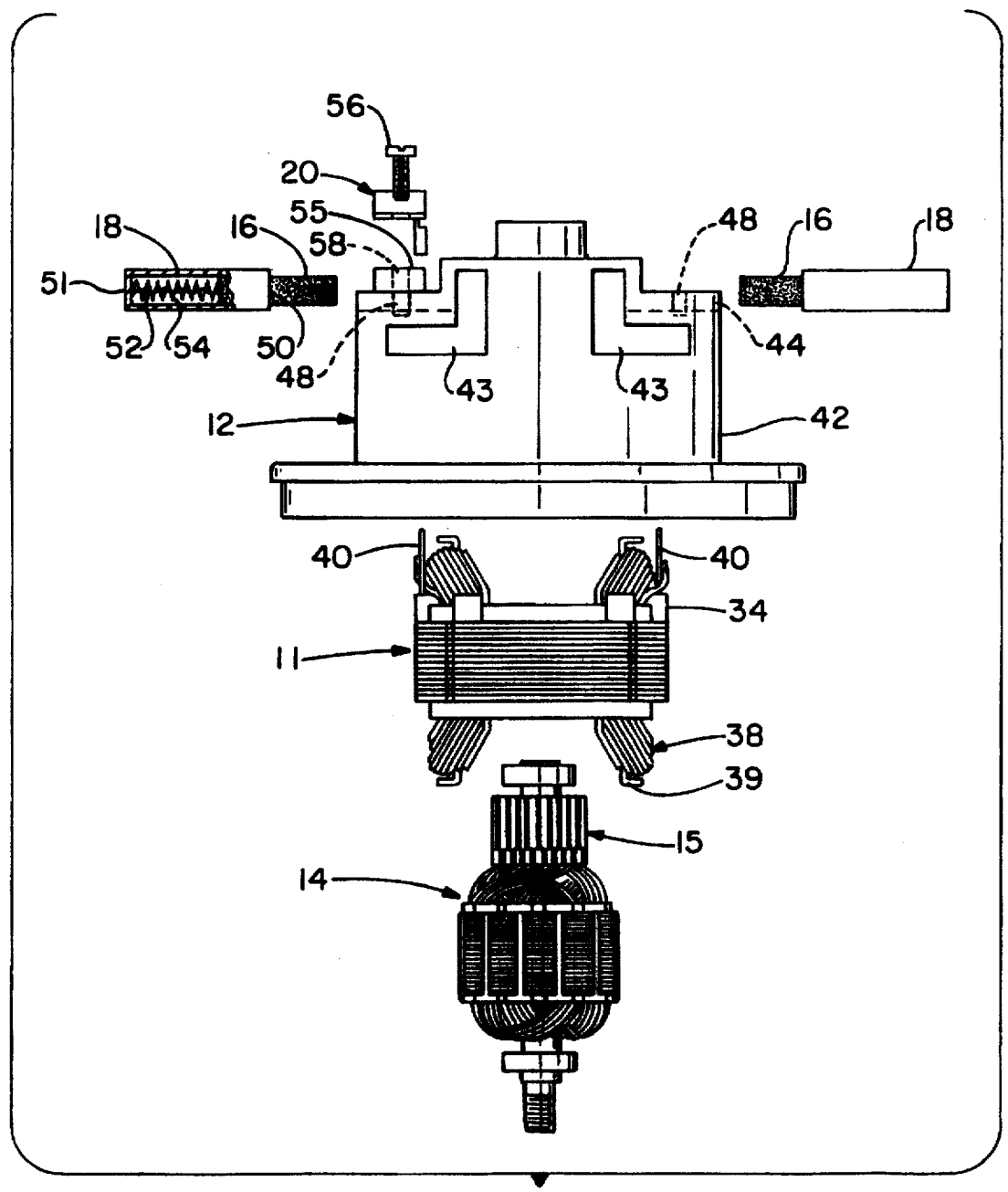
FIG. 5 is an exploded elevational view of the commutating brush assembly according to the invention.

As can be seen, when the retaining clip 20 is affixed to the brush holder mounts 44 the terminal portion 23 of the clip 20 is located so as to pluggingly engage the tabs 40 of the terminal board 39. Accordingly, an electrical connection is established between the stator windings 38 and the brushes 16 by way of the retaining clip 20, the brush holder sleeve 18, and the pigtail wire 52. It will thus be recognized that the novel retaining clip 20 according to the invention serves to both maintain the brush holder sleeve 18 and brush 16 in a proper position relative to the commutator 15 and also establish the requisite electrical connection between the brush 16 and the stator windings 38. It is contemplated that the retaining clip 20 may employ a wide variety of terminal connections other than the faston style slot 35 and tab 40 arrangement. For instance, it is contemplated that the clip 20 could be electrically connected directly to the stator windings 38 by way of a direct lead 60 as shown in FIG. 6. Such an arrangement may be desirable in motors having a boardless stator assembly.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A combined electrically conductive commutator brush retaining clip and electrical connector for a commutated motor having a motor housing with a stator and a rotor disposed therein, the rotor having a commutator, the combined retaining clip and electrical connector comprising:

a main body portion disposed along a first plane;

a terminal portion extending from said main body portion;

a stepped portion formed by side walls angularly extending from said main body portion and connected to each other by a top wall, wherein said top wall is substantially parallel with said first plane of said main body portion, said stepped portion being removably secured to the housing and maintaining a commutator brush and brush holder assembly adjacent the housing and also in electrical contact with the commutator, wherein the commutator brush and brush holder assembly comprises a carbon commutator brush having a pigtail wire affixed to one end thereof, and an electrically conductive brush holder sleeve for maintaining the commutator brush therein, wherein an opposite end of the pigtail wire is electrically connected to an interior surface of said brush holder; and, said terminal portion having means for establishing an electrical connection between the brush and brush holder assembly and the stator, and wherein the electrical connection is maintainable between said terminal portion and the stator even if said main body portion releases said brush holder from the housing.

2. A combined commutator brush retaining clip and electrical connector according to claim 1, wherein said stepped portion provides a plurality of dimples extending from said top wall and contacting said brush holder.

3. A combined commutator brush retaining clip and electrical connector according to claim 2, wherein said means for establishing an electrical connection comprises a connector member disposed on said terminal portion for matingly engaging a corresponding connector member on said stator.

4. A combined commutator brush retaining clip and electrical connector according to claim 3, wherein said means for maintaining further comprises removable fastener means for clampingly maintaining said brush holder between said clip and a mounting plane of the motor housing to allow for replacement of said brush holder, wherein said mounting plane is substantially perpendicular to a periphery of a cup portion of the motor housing.

5. A combined commutator brush retaining clip and electrical connector according to claim 4, wherein said fastener means comprises at least one screw, and at least one spacer member, said spacer member interposed between said clip and the motor housing and said at least one screw engaging said clip, said spacer, and said housing.

6. A combined commutator brush retaining clip and electrical connector according to claim 5, wherein the brush holder sleeve is maintained within said stepped portion and is received between said side walls and said dimples frictionally engage the brush holder.

7. A combined commutator brush retainer and electrical connector assembly comprising:

a commutator housing;

a rotor disposed within said commutator housing, said rotor having a commutator;

a stator disposed within said commutator housing, said stator having a terminal tab connected to a stator winding;

a commutator brush;

an electrically conductive brush holder sleeve slidably receiving said commutator brush, wherein said brush holder sleeve is connected to said commutator brush by a pigtail wire; and clip means for removably retaining said commutator brush and said brush holder sleeve to said commutator housing and for establishing an electrical connection between said commutator brush, said electrically conductive brush holder and said stator, said clip means comprising a main body disposed along a first plane, said main body has extending therefrom a terminal portion and a pair of side walls, said pair of side walls interconnected by a top wall that is substantially parallel with said first plane of said main body, said top wall and said side walls receiving and clamping said electrically conductive brush holder to said commutator housing, wherein a connector member extends from said terminal portion for matingly engaging said terminal tab on said stator.

8. A combined commutator brush retainer and electrical connector assembly according to claim 7, wherein said top wall provides a plurality of dimples contacting said brush holder.

9. A combined commutator brush retainer and electrical connector assembly according to claim 8, wherein said commutator brush has said pigtail wire affixed to one end thereof, an opposite end of said pigtail wire also being affixed to a closed end of said brush holder sleeve.

10. A combined commutator brush retainer and electrical connector assembly according to claim 9, wherein said clip means further comprises selectively removable fastener means for clampingly maintaining said brush holder sleeve between said clip and said motor housing.

11. A combined commutator brush retainer and electrical connector assembly according to claim 10, wherein said fastener means comprises at least one screw, and at least one spacer member, said spacer member interposed between said main body portion and said motor housing and said at least one screw engaging said clip, said spacer, and said housing.

12. A combined commutator brush retainer and electrical connector assembly according to claim 11, wherein said brush holder sleeve is maintained within said recessed portion and said dimples frictionally engage said brush holder sleeve.

13. An improved commutator brush retainer and electrical connector for a commutated motor assembly having a commutator housing, a stator portion disposed in the housing, a rotor portion disposed in the stator, and a commutator on the rotor, comprising:

a commutator brush assembly which provides a carbon brush member with one end that engages the commutator and an opposite end that is connected to one end of a pigtail wire, wherein said carbon brush member is spring biased within an electrically conductive brush holder sleeve which has a closed end that is connected to an opposite end of said pigtail wire; and clip means for removably retaining the commutator brush assembly to the commutator housing and for establishing an electrical connection between the commutator brush assembly and the stator, wherein said clip means comprises a clip member having a main body portion disposed along a first plane and a terminal portion disposed along a second plane said main body portion having a stepped portion formed by angularly extending sidewalls extending from said main body portion said sidewalls connected to each other by a top wall, wherein said top wall is substantially parallel with said first plane of said main body portion, said stepped portion having a plurality of dimples therein, and said terminal portion extending perpendicularly from said main body portion and which includes a connector member disposed thereon for matingly engaging a corresponding connector member on the stator, and wherein said brush holder sleeve is maintained within said stepped portion and said plurality of dimples frictionally engaging said brush holder sleeve, and wherein the electrical connection is maintainable between said terminal portion and the stator even if said main body portion releases said brush holder from the housing.

* * * * *